United States Patent
Shao et al.

(10) Patent No.: US 8,654,767 B2
(45) Date of Patent: *Feb. 18, 2014

(54) METHOD AND SYSTEM FOR WIRELESS COMMUNICATION OF AUDIO IN WIRELESS NETWORKS

(71) Applicant: Samsung Electronics Co., Ltd., Suwon (KR)

(72) Inventors: Huai-Rong Shao, San Jose, CA (US); Ju-Lan Hsu, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,615

(22) Filed: Nov. 29, 2012

(65) Prior Publication Data

US 2013/0088641 A1 Apr. 11, 2013

Related U.S. Application Data

(63) Continuation of application No. 12/822,107, filed on Jun. 23, 2010, now Pat. No. 8,345,681.

(60) Provisional application No. 61/245,180, filed on Sep. 23, 2009.

(51) Int. Cl.
*H04L 12/28* (2006.01)
*H04J 3/24* (2006.01)

(52) U.S. Cl.
USPC .......................................... 370/389; 370/474

(58) Field of Classification Search
USPC .......... 370/389, 394, 401, 474–476, 509, 510
See application file for complete search history.

(56) References Cited

U.S. PATENT DOCUMENTS 6,108,486 A * 8/2000 Sawabe et al. ................ 386/338
7,499,462 B2 3/2009 MacMullan et al.
7,523,241 B2 * 4/2009 Konishi ......................... 710/302
7,567,588 B2 * 7/2009 Satoh et al. .................... 370/474

(Continued)

FOREIGN PATENT DOCUMENTS

EP 1995952 A1 11/2008
KR 1020060045718 A 5/2006

OTHER PUBLICATIONS

International Search Report and Written Opinion dated Jun. 3, 2011 for International Application No. PCT/KR2010/006500 filed on Sep. 20, 2010, pp. 1-9, Korean Intellectual Property Office, Seo-gu, Daejeon, Republic of Korea.

(Continued)

*Primary Examiner* — Hong Cho
(74) *Attorney, Agent, or Firm* — Kenneth L. Sherman, Esq.; Michael Zarrabian, Esq.; Sherman & Zarrabian LLP

(57) ABSTRACT

A method and system for audio transmission in a wireless communication system which transmits digital video and digital audio in High-Definition Multimedia Interface (HDMI) format. Position information of audio packets within the HDMI frame is obtained. Digital audio information including the position information is transmitted from a data source device to a data sink device via a wireless communication medium. At the data sink device, an HDMI frame is reconstructed by inserting received audio packets into horizontal and vertical blanking periods of the HDMI frame.

37 Claims, 8 Drawing Sheets

(56) References Cited

U.S. PATENT DOCUMENTS

| | | | |
|---|---|---|---|
| 7,756,133 B2 | 7/2010 | Glaser | |
| 8,032,077 B2* | 10/2011 | Yuasa | 455/3.06 |
| 8,059,550 B2* | 11/2011 | Saito et al. | 370/242 |
| 8,355,078 B2 | 1/2013 | Min | |
| 8,365,238 B2 | 1/2013 | Reznic et al. | |
| 2006/0209745 A1* | 9/2006 | MacMullan et al. | 370/328 |
| 2007/0011720 A1* | 1/2007 | Min | 725/151 |
| 2007/0036158 A1* | 2/2007 | Hun-Kwon et al. | 370/389 |
| 2007/0186015 A1* | 8/2007 | Taft et al. | 710/16 |
| 2008/0278567 A1* | 11/2008 | Nakajima | 348/14.02 |
| 2010/0046557 A1* | 2/2010 | Guan et al. | 370/476 |

OTHER PUBLICATIONS

LG Electronics Inc. et al., "WirelessHD Specification Version 1.0 Overview", Oct. 9, 2007, pp. i-ii, 59-68, and 74-77, LG Electronics Inc. et al., USA.

Hitachi, Ltd. et al., "High-Definition Multimedia Interface Specification Version 1.2a", Dec. 14, 2005, pp. i-ii and 43-66, Hitachi, Ltd. et al., USA.

U.S. Notice of Allowance for U.S. Appl. No. 12/822,107 mailed Aug. 30, 2012.

European Search Report dated Jan. 24, 2013 for European Application No. 10819047.1, pp. 1-7, European Patent Office, Munich, Germany.

Russian Office Action dated Apr. 2, 2013 for Russian Application No. 2012116090/07, pp. 1-8, Federal Service for Intellectual Property (Rospatent), Moscow, Russia (Machine-generated English language translation included pp. 1-4).

Hitachi, Ltd. et al., "High-Definition Multimedia Interface Specification Version 1.4," Jun. 5, 2009, pp. i-127 and HEAC-i-HEAC-72, HDMI Licensing, LLC, USA.

Australian Office Action dated Aug. 5, 2013 for Australian Application No. 2010298908, Australian Government IP Australia, pp. 1-3, Woden ACT, Australia.

Russian Office Action dated Aug. 6, 2013 for Russian Application No. 2012116090/07, pp. 1-7, Federal Service for Intellectual Property (Rospatent), Moscow, Russia (Machine-generated English language translation included pp. 5-7).

Indonesia Office Action dated Jun. 26, 2013 for Indonesia Application No. W00201201551, Ministry of Justice and Human Rights of the Republic of Indonesia Directorate General of Intellectual Property Rights, pp. 1-5, Banten, Indonesia, (English-language translation included pp. 3-5).

* cited by examiner

70

| Line type | V Position | Number of lines | Infoframe exists | Audio data exists | Video data exists | Payload |
|---|---|---|---|---|---|---|
| 1 bit | 12 bits | 8 bits | 1 bit | 1 bit | 1 bit | Variable size |

METHOD AND SYSTEM FOR WIRELESS COMMUNICATION OF AUDIO IN WIRELESS NETWORKS

CROSS-REFERENCE TO RELATED APPLICATIONS

This application is a continuation of U.S. patent application Ser. No. 12/822,107 filed Jun. 23, 2010, which in turns claims priority from U.S. Provisional Patent Application Ser. No. 61/245,180 filed on Sep. 23, 2009, incorporated herein by reference.

FIELD OF THE INVENTION

The present invention relates in general to wireless communication, and in particular, to audio transmission in wireless networks.

BACKGROUND OF THE INVENTION

High-Definition Multimedia Interface (HDMI) is a compact audio/video interface for transmitting uncompressed digital data. In an HDMI frame, audio information can be transmitted in Vertical or Horizontal blanking periods and the positions of the audio information segments in the blanking areas are decided according to the synchronization between audio and video (Lip-sync). However, typically Vertical or Horizontal blanking areas are not transmitted in a wireless system in order to reduce the data rate of a communication stream between a transmitter and a receiver.

BRIEF SUMMARY OF THE INVENTION

Embodiments of the present invention provide a method and system for audio transmission in a wireless communication system which transmits digital video and digital audio in High-Definition Multimedia Interface (HDMI) format.

One embodiment of the invention comprises a process for communicating audio information by obtaining position information of audio packets within a High-Definition Multimedia Interface (HDMI) frame. The process further includes transmitting digital audio information including said position information from a data source device to a data sink device via a wireless communication medium. For wireless transmission, audio and video synchronization is maintained by aggregating audio and video packets together during transmission.

The process may further include, at the data sink device, reconstructing an HDMI frame by inserting received audio packets into horizontal and vertical blanking periods of the HDMI frame.

These and other features, aspects and advantages of the present invention will become understood with reference to the following description, appended claims and accompanying figures.

BRIEF DESCRIPTION OF THE DRAWINGS

FIG. 8 shows an aggregated audio packet format, according to another embodiment of the invention.

DETAILED DESCRIPTION OF THE INVENTION

Figure 1:
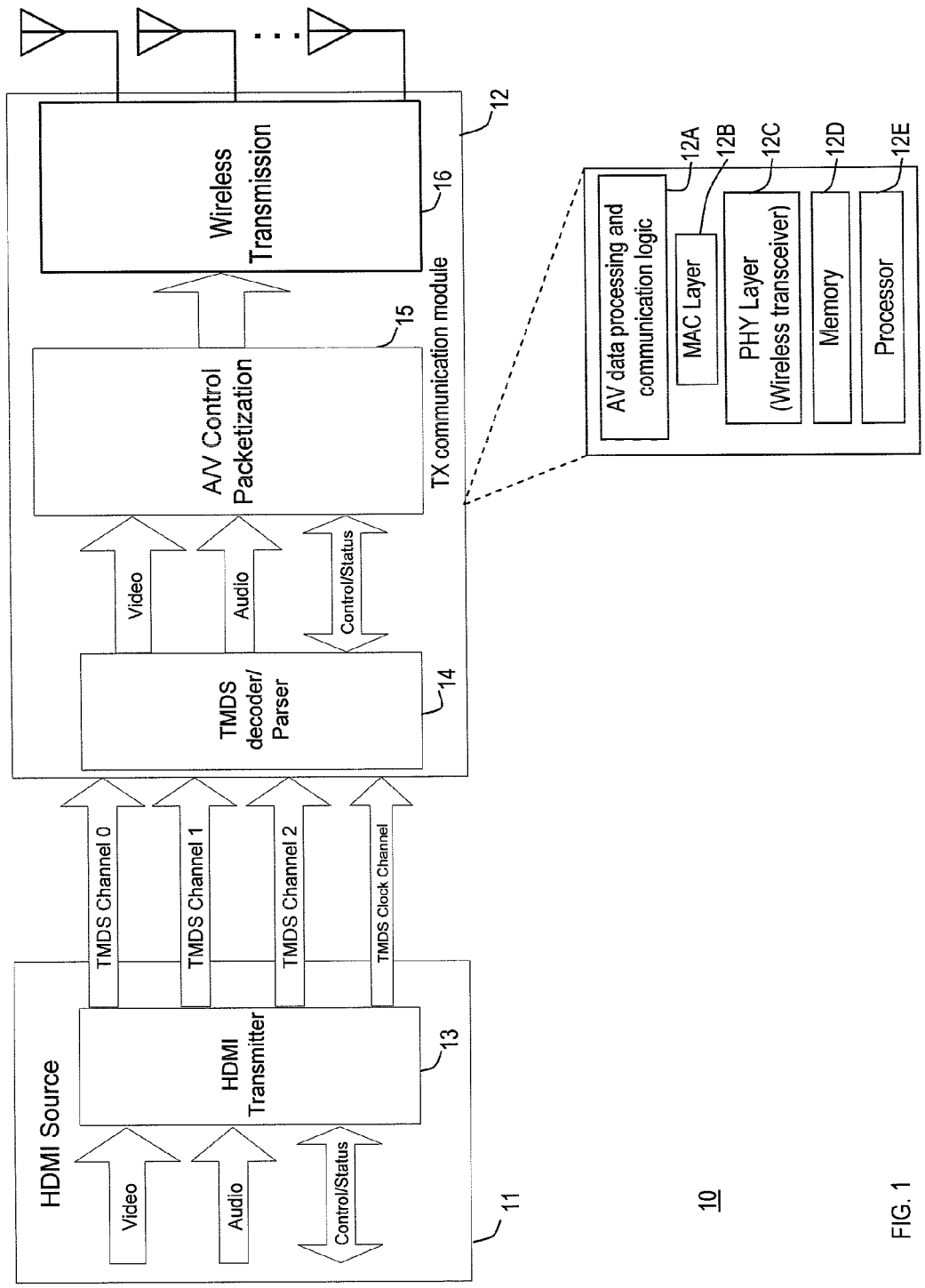
FIG. 1 illustrates a system diagram for an electronic transmitting wireless station device for audio transmission in a wireless communication system which transmits digital video and digital audio in High-Definition Multimedia Interface (HDMI) format, according to an embodiment of the invention.

Embodiments of the present invention provide a method and system for audio transmission in a wireless communication system which transmits digital video and digital audio in High-Definition Multimedia Interface (HDMI) format. The digital video and audio is transmitted from a data source at a wireless transmitter to a data sink at a wireless receiver, over a wireless communication medium (e.g., radio frequency (RF)).

One embodiment of the invention comprises a wireless communication system implementing a communication process for transmitting digital audio information from a data source at a wireless transmitter (e.g., a transmitting wireless station) to a data sink at a wireless receiver (e.g., a receiving wireless station), during blanking periods corresponding to an HDMI frame to maintain time synchronization with video information (i.e., maintaining synchronization between audio and video (Lip-sync)). For wireless transmission, audio and video synchronization is maintained by aggregating audio and video packets together during transmission, according to an embodiment of the invention.

One implementation of the communication process comprises transmission of HDMI audio over a wireless channel (e.g., RF channel) to minimize jitter between digital audio and video information. The position information of each audio packet in the HDMI frame at the transmitter side is included in audio packets, wherein the receiver side reconstructs an HDMI frame containing both video and audio information synchronized to each other. Accordingly, the HDMI audio achieves synchronization with video by carrying the position information of audio packets within the HDMI frame.

Two example schemes for generating position information of audio packets within the HDMI frame according to the present invention are described below. A first scheme (Scheme 1) comprises obtaining accurate position for each audio packet within an HDMI frame, wherein the position information is wirelessly transmitted from the transmitter to the receiver. A second scheme (Scheme 2) comprises obtaining position estimation information for all the audio packets in an aggregated audio packet, wherein the aggregated packet is wirelessly transmitted from the transmitter to the receiver.

In each scheme, the receiver reconstructs an HDMI frame by inserting audio packets into horizontal and vertical (H, V) blanking periods. These schemes are described in more detail below.

In one implementation, said Scheme 1 for generating position information of audio packets within the HDMI frame, according to the present invention, comprises adding vertical and horizontal position information to each audio packet and aggregating multiple audio packets together in an HDMI frame utilizing a packetization process at the transmitter side. The digital data is then wirelessly transmitted from the transmitter to a receiver. From the received data, the receiver reconstructs an HDMI frame that is the same or very similar to the HDMI frame at the transmitter, by placing each audio packet at the indicated vertical and horizontal position within blanking areas.

In one implementation, said Scheme 2 comprises estimating audio packet distribution pattern, aggregating multiple audio packets together, and adding audio packet distribution pattern information to the aggregated audio packet when performing packetization at the transmitter. The digital data is then wirelessly transmitted to the receiver.

From the received data, the receiver reconstructs an HDMI frame that is similar to the HDMI frame at the transmitter, by placing each audio packet at the expected vertical line calculated from the audio packet distribution pattern. The jitter between audio and video is bounded to meet Quality of Service (QoS) requirements by estimating the audio packet distribution pattern.

FIG. 1 illustrates a system diagram for a wireless HDMI transmitting station 10 (TX), implementing wireless communication of HDMI audio, according to an embodiment of the invention. The transmitter 10 comprises an HDMI source 11 (e.g., a digital media generating device) and a transmitter communication module 12.

The HDMI source 11 comprises an HDMI Transmitter 13 that provides digital audio, uncompressed video, and other auxiliary data (e.g., packet header) in HDMI format to the transmitter communication module 12. The format includes Transition Minimized Differential Signaling (TMDS) signals.

The communication module 12 includes a decoder/parser 14 that decodes the TMDS signals, removing vertical and horizontal areas. The communication module 12 further includes an audio/video (A/V) packetization controller 15 that packetizes the audio, uncompressed video and other auxiliary data into packets for transmission on a wireless channel via a wireless transmission module 16 (e.g., 60 GHz wireless transmission module) via multiple antennas over a wireless channel.

In one implementation, the transmitter communication module 12 may comprise AV data processing and communication logic 12A implementing the functions of the modules 14 and 15, and a Media Access (MAC) layer 12B and a physical (PHY) layer 12C implementing the functions of the module 16. The module 12 further comprises memory 12D and hardware processor 12E.

Figure 2:
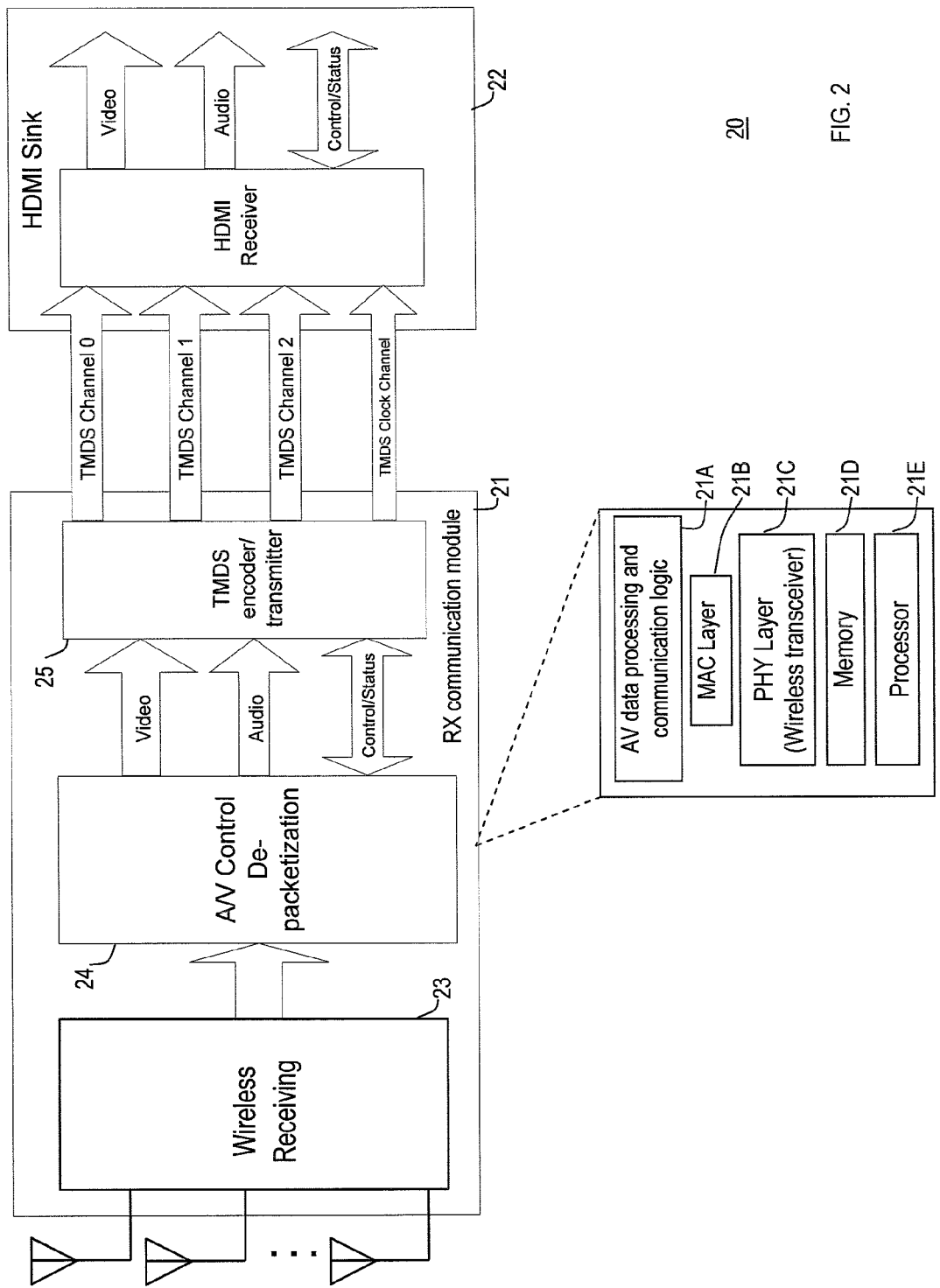
FIG. 2 illustrates a system diagram for an electronic receiving wireless station device for audio communication in a wireless communication system which receives digital video and digital audio in HDMI format, according to an embodiment of the invention.

FIG. 2 illustrates a system diagram for a wireless HDMI receiving station 20, implementing wireless communication of HDMI audio, according to an embodiment of the invention. The receiver 20 comprises a communication module 21 and an HDMI sink (e.g., a digital media player device).

The receiver communication module 21 includes a wireless receiving module for wirelessly receiving the transmission from the transmitter 10 over multiple antennas (e.g., over 60 GHz wireless channel). The receiver communication module 21 further includes an audio/video de-packetization controller 24 that de-packetizes the information from packets received from the wireless channel.

The receiver communication module 21 further includes an encoder module 25 that encodes the de-packetized information into TMDS format, and reconstructs HDMI frames (adding Vertical and Horizontal areas). The encoder module 25 then passes the TMDS signals to the HDMI sink 22 for consumption (e.g., HDMI receiver in the HDMI sink).

In one implementation, the receiver communication module 21 may comprise audio/video (AV) data processing and communication logic 21A implementing the functions of the modules 24 and 25, and a MAC layer 21B and PHY layer 21C implementing the functions of the wireless receiving module 23. The module 21 further comprises memory 21D and hardware processor 21E.

Figure 3:
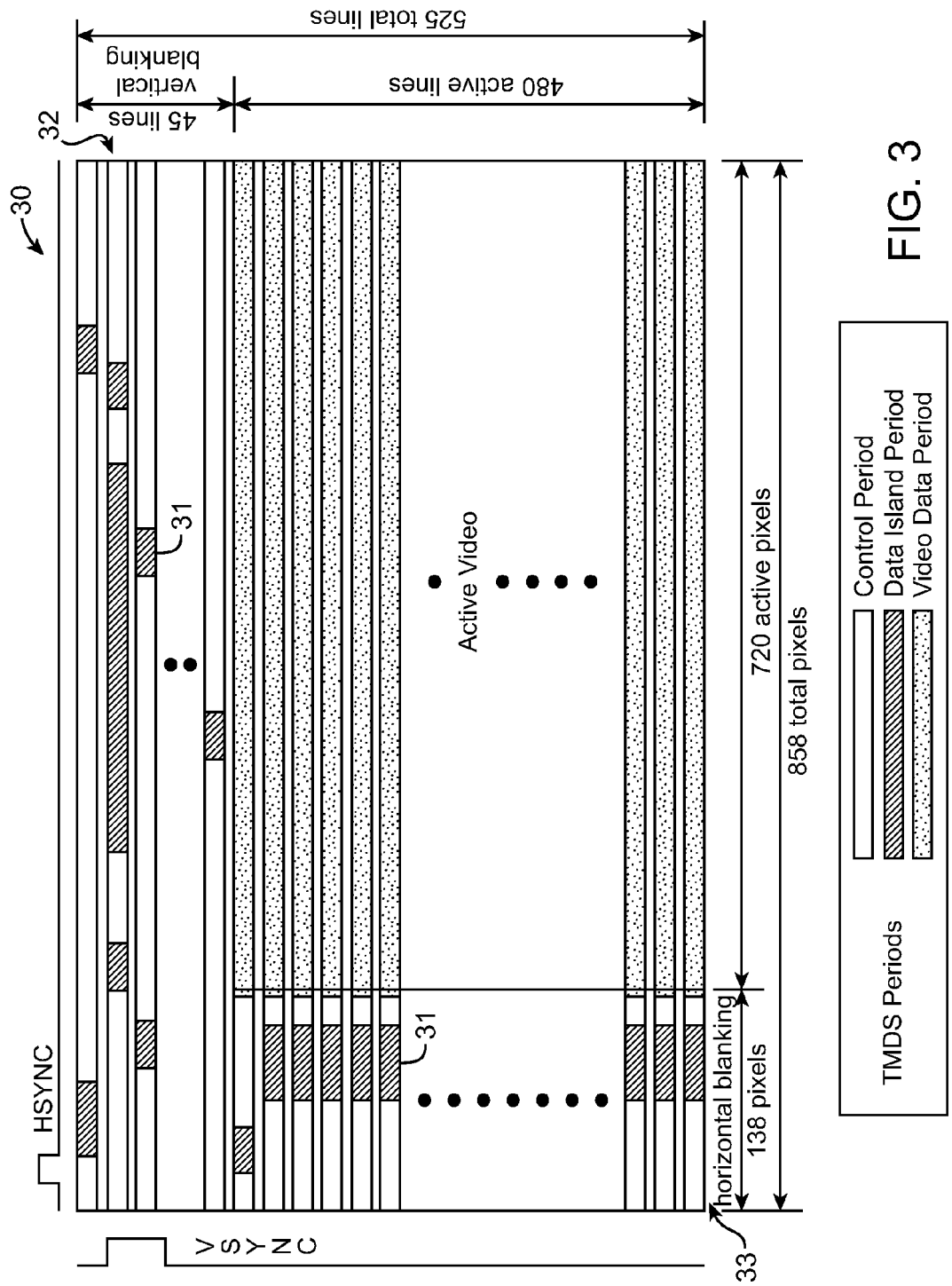
FIG. 3 shows an example HDMI data frame structure for 720p digital video.

FIG. 3 shows an example HDMI data frame structure 30 for 720p digital video, utilized for HDMI communication between the transmitter 10 and the receiver 20, according to an embodiment of the invention. As illustrated, there are 45 lines for vertical blanking and 138 pixels for horizontal blanking at each vertical line which carries active video information. Digital audio or other auxiliary data can be carried in data island periods 31 within vertical and horizontal blanking areas 32, 33, respectively.

When an HDMI frame is formed at the HDMI source 11 (FIG. 1), audio/video synchronization requirements determine placement of audio packets in the blanking areas 32, 33 (FIG. 3). The HDMI frame structure 30 is designed for synchronous transmission. However, since for wireless transmission (such as 60 GHz wireless communication) only packet-based asynchronous transmission is utilized, the present invention accounts for synchronization between audio and video for wireless transmission of audio and video from the HDMI source 11 to the HDMI sink 22 using HDMI frame conversion and packetization.

Figure 4:
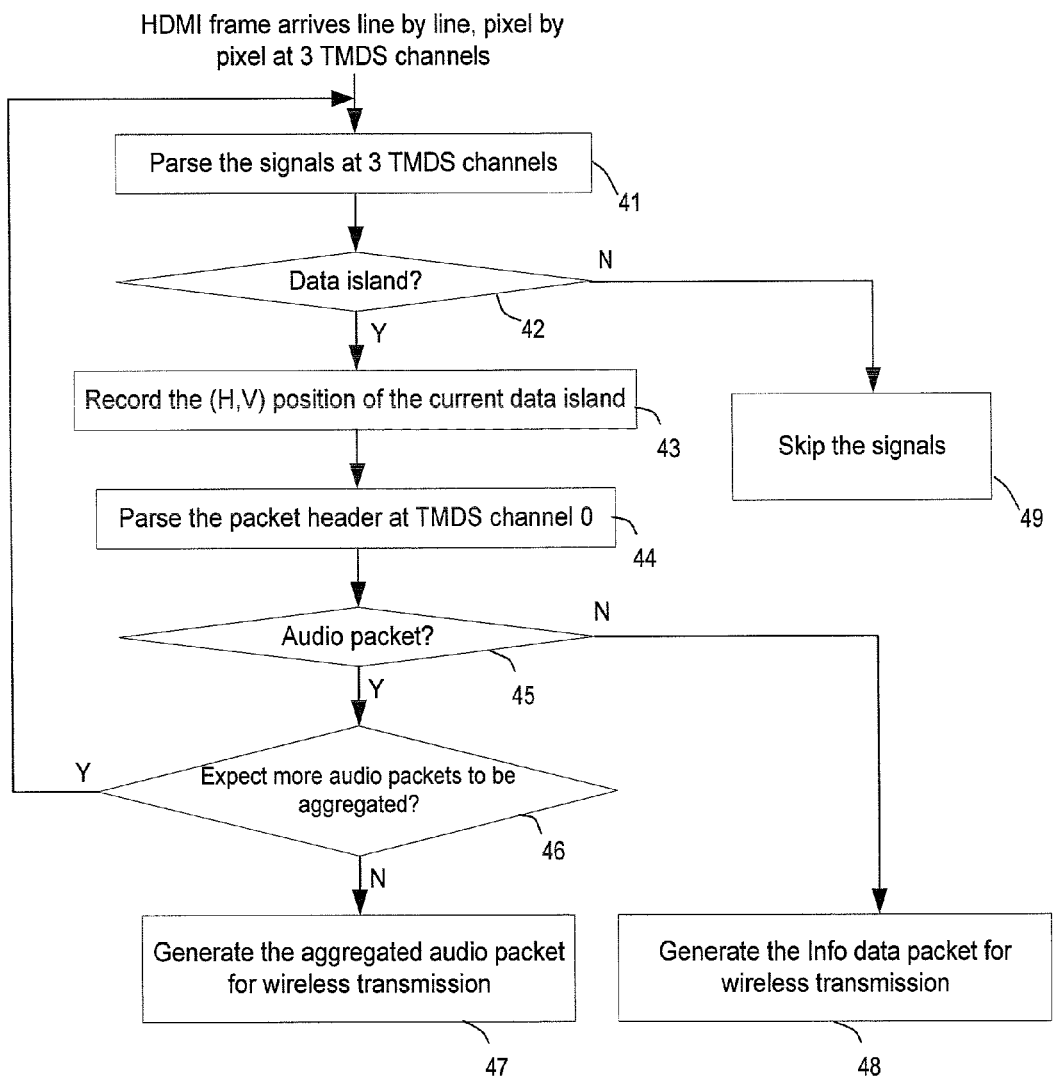
FIG. 4 illustrates an example process for HDMI frame conversion and packetization at the transmitter of FIG. 1, according to an embodiment of the invention.
Figure 6:
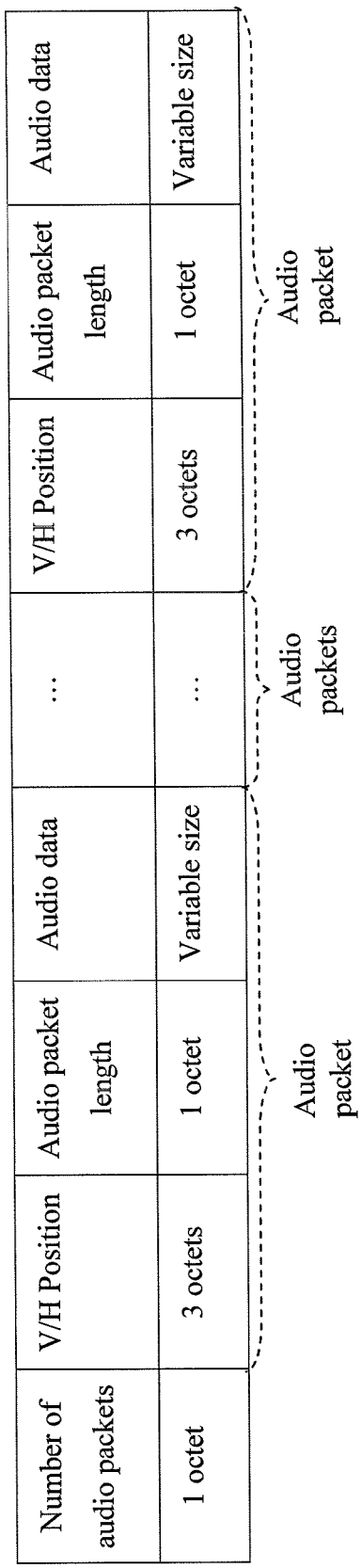
FIG. 6 shows an aggregated audio packet format, according to an embodiment of the invention.
Figure 7:
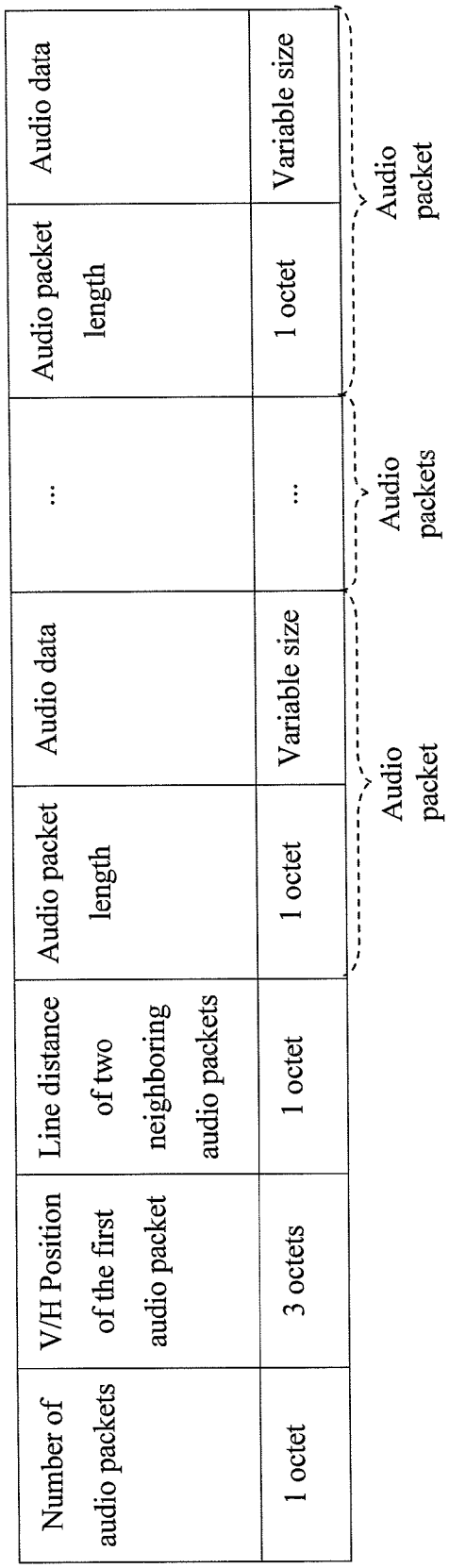
FIG. 7 shows an aggregated audio packet format, according to another embodiment of the invention.

FIG. 4 illustrates an example process 40 for HDMI frame conversion and packetization at the communication module 12 of the wireless transmitter 10 (FIG. 1), according to an embodiment of the invention. The process 40 comprises process blocks for processing an HDMI frame 30 arriving as signals from HDMI source 11 to the communication module 12 at three TMDS channels, wherein:

Block 41: Parse the signals at 3 TMDS channels representing an HDMI frame.
Block 42: Does the HDMI frame include a data island? If yes, proceed to block 43, else no audio in the HDMI frame, proceed to block 49.
Block 43: Record (H,V) position of the current data island in the HDMI frame.
Block 44: Parse a data packet header at TMDS channel 0.
Block 45: Determine if the packet is an audio packet? If yes, proceed to block 46, else proceed to block 48.
Block 46: Determine if additional audio packets are to be aggregated? If yes, proceed to block 41, else proceed to block 47.
Block 47: Generate an aggregated audio packet (FIGS. 6-7) from the received audio packets for wireless transmission. End.
Block 48: Generate an Info data packet for wireless transmission (Info data packet typically carries control messages). End.

The transmitter 10 records the starting position of each data island and parses a data packet header at TMDS channel 0 from the HDMI source 11. If the data packet is an audio packet, the transmitter 10 considers whether to wait for more incoming audio packets according to an audio/video jitter requirement and the expected size of an aggregated audio packet. If the data packet is an Infoframe packet, typically the transmitter 10 does not aggregate the Infoframe packets.

In one example, the HDMI frame conversion is performed by the decoder/parser 14 (FIG. 1), and packetization is performed by the packetization controller 15, at the transmitter 10. In one example, frame conversion includes decoding TMDS coded data signals and removing the H and V areas from a HDMI frame. In one example, packetization includes separating audio, video and data information, and placing them into packets.

Figure 5:
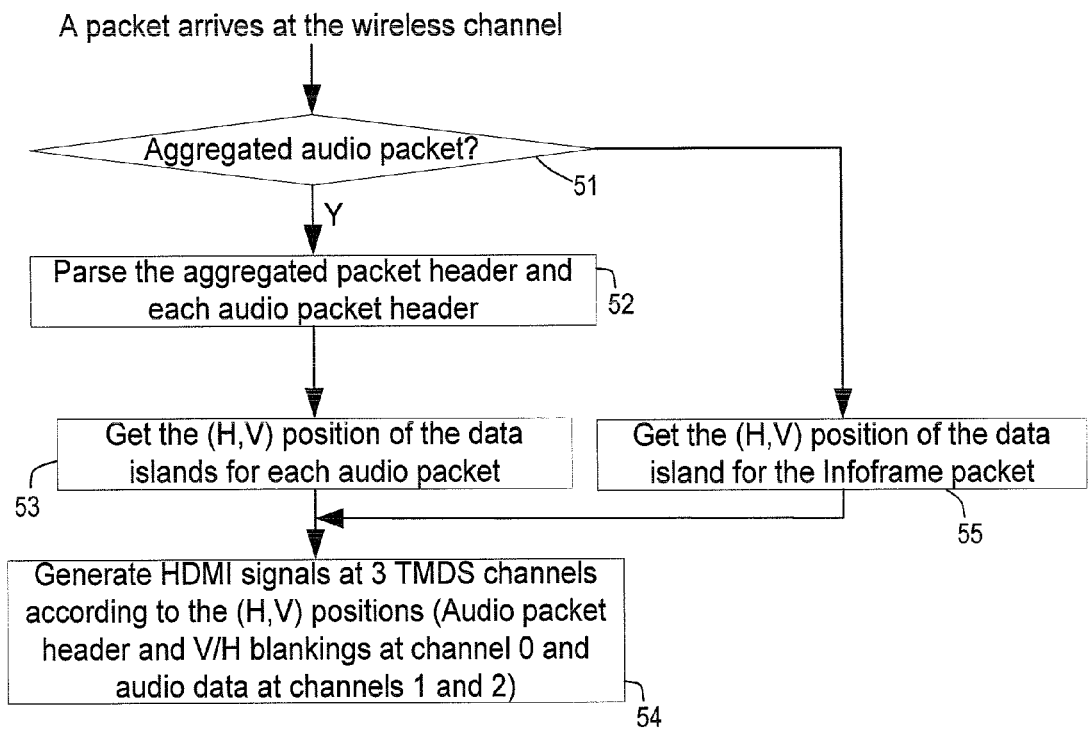
FIG. 5 illustrates an example reverse process for de-packetization and HDMI frame reconstruction at the receiver of FIG. 2, according to an embodiment of the invention.

FIG. 5 illustrates an example reverse process 50 for de-packetization and HDMI frame reconstruction at the communication module 21 of the wireless receiver 20 (FIG. 2), according to an embodiment of the invention. The process 50 comprises process blocks for processing an arriving data packet from the transmitter 10 over the wireless channel, wherein:

Block 51: Determine if the arriving packet is an aggregated audio packet? If yes, proceed to block 52, else proceed to block 55.

Block 52: De-packetize by parsing the aggregated packet header and each audio packet header in the aggregated packet header.

Block 53: Obtain (H,V) position of the data islands for each audio packet.

Block 54: Generate HDMI signals at three TMDS channels according to the (H,V) positions, with audio packet header and V/H blanking at channel 0, and audio data at channels 1 and 2. End.

Block 55: Obtain (H,V) position of the data island for the Infoframe packet. Proceed to block 54.

In this example, de-packetization is performed by the de-packetization module 24 (FIG. 2), and HDMI frame reconstruction is performed by the TMDS encoder/transmitter module 25, at the receiver 20. In one example, depacketization includes extracting information from packets in reverse manner as packetization described above.

For generating aggregated audio packets at the transmitter 10 according to embodiments of the invention, said Scheme 1 for generating position information of audio packets within the HDMI frame includes carrying an accurate position for each audio packet within the HDMI frame. Referring to an example aggregated audio packet format 60 in FIG. 6, according to Scheme 1 of the present invention, vertical and horizontal position information (V/H Position field) is added to each audio packet and multiple audio packets are aggregated together during packetization by the packetization controller 15 at the transmitter 10.

The receiver 20 then reconstructs the same HDMI frame at the transmitter 10 by placing each audio packet at the indicated vertical and horizontal position within blanking areas of the reconstructed HDMI frame. The V/H Position field in the aggregated packet 60 contains the vertical and horizontal position information of one audio packet such as n octets (e.g., 12 bits may be used to represent each vertical or horizontal position). The value n in the packet 60 is an integer such as 3, 4, etc. The Audio Packet Length field in the aggregated packet 60 indicates the length of an audio packet in octets.

Said Scheme 2 for generating position information of audio packets within the HDMI frame according to an embodiment of the invention, includes carrying the position estimation information for all the audio packets in an aggregated audio packet. Referring to an example aggregated audio packet format 70 in FIG. 7, according to Scheme 2 of the present invention, 4 octets representing V/H Position and Line distance, are introduced in the header for each audio packet.

To reduce header overhead, the audio packet distribution pattern is estimated. For example, if audio packets at the vertical lines 10, 12, 13, 16, 18 need to be aggregated, it can be estimated that the line distance between two neighboring packets is 2, and in FIG. 7, V/H Position of the first audio packet field is set to 10 and the Line distance of two neighboring audio packets field is set to 2. Multiple audio packets are aggregated together in the aggregated packet 70, wherein audio packet distribution pattern information (i.e., Line distance of two neighboring audio packets) is added by the packetization controller 15 to the aggregated audio packet 70 during packetization at the transmitter 10.

The receiver 20 reconstructs an HDMI frame similar to the HDMI frame at the transmitter 10 by placing each audio packet at the expected vertical line calculated from the audio packet distribution pattern. The jitter between audio and video is bounded to meet the QoS requirement by estimating the audio packet distribution pattern. Line distance of two neighboring audio packets field in the aggregated packet 70 indicates the average number of lines between two audio packets. For example, the receiver side can reconstruct the vertical line numbers of the audio packets at vertical lines 10, 12, 14, 16, 18, and it needs not be the same as the transmitter side (as line 14 deviates), with minor differences from the original positions at vertical lines 10, 12, 13, 16, 18.

An alternative embodiment for the audio/video synchronization according to the present invention comprises a vertical-line based approach which mixes audio and video information as shown by the example aggregated packet 80 in FIG. 8, during packetization at the transmitter 10. The Line type field in aggregated packet 80 sets to "1" if the first vertical line in the aggregated packet 80 carries active data, and sets to "0" if the first vertical line is a vertical blanking line. The V position field indicates the vertical line index of the first vertical line in the aggregated packets. The Number of lines field indicates number of vertical lines in the current packet 80.

The Line type field sets to "1" if the first vertical line in the aggregated packet 80 carries active data, and sets to "0" if the first vertical line is a vertical blanking line. The Infoframe exists field indicates whether the Infoframe data are carried in the current packet 80. The Audio data exists field indicates whether the audio data is carried in the current packet 80. The Video data exists field indicates whether the video data is carried in the current packet 80.

The invention provides data rate reduction by avoiding transmission of blanking information while achieving audio/video synchronization performance. The receiver reconstructs the HDMI frame by inserting audio packets into vertical and horizontal blanking periods, while achieving audio/video synchronization. Even though audio and video use different clocks, the invention directly uses position information to avoid conversion at both transmitter side and receiver side.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, as wireless transmitters, as wireless receiver, etc. Further, embodiments of the invention can take the form of an entirely hardware embodiment, an entirely software embodiment or an embodiment containing both hardware and software elements.

What is claimed is:
1. A method of communicating audio information, comprising:
    determining horizontal and vertical position information of audio packets within a frame; and transmitting digital audio information including said position information from a data source device to a data sink device via a wireless communication medium.

2. The method of claim 1, wherein determining said horizontal and vertical position information comprises determining horizontal and vertical position of a current data island including audio, within vertical and horizontal blanking areas in the frame.

3. The method of claim 2, wherein transmitting audio information further includes:
carrying in each audio packet accurate position for the audio packet wirelessly transmitted from the data source device to the data sink device.

4. The method of claim 2 wherein:
transmitting audio information further includes carrying position estimation information for all the audio packets in an aggregated audio packet wirelessly transmitted from the source device to the sink device.

5. The method of claim 4, wherein transmitting audio information further includes:
adding vertical and horizontal position information to each audio packet and aggregating multiple audio packets together utilizing a packetization process; and
transmitting the aggregated audio packets from the data source device to the data sink device over the wireless communication medium.

6. The method of claim 5 further comprising:
estimating audio packet distribution pattern; and
carrying the estimated audio packet distribution in the aggregated packet.

7. The method of claim 6, wherein the estimated audio packet distribution pattern comprises line distance of two neighboring audio packets within the frame.

8. The method of claim 2 further comprising:
at the data sink device, reconstructing a frame by inserting received audio packets into horizontal and vertical blanking periods of the frame.

9. The method of claim 8, wherein reconstructing a frame further comprises:
generating signals at three Transition Minimized Differential Signaling (TMDS) channels according to the horizontal and vertical positions, with audio packet header and horizontal and vertical blanking at channel 0, and audio data at channels 1 and 2.

10. The method of claim 2, wherein the data source device comprises a High-Definition Multimedia Interface (HDMI) transmitter.

11. A system for wireless communication of audio information, comprising:
a wireless audio source device including:
a control module that transmits digital audio information including horizontal and vertical position information determined from audio packets within a frame to a data sink device via a wireless communication medium.

12. The system of claim 11, further comprising:
a parser module that obtains the horizontal and vertical position information of audio packets within the frame.

13. The system of claim 12, wherein the parser module obtains the horizontal and vertical position information of audio packets by determining horizontal and vertical position of a current data island including audio, within vertical and horizontal blanking areas in the frame.

14. The system of claim 13, wherein the control module includes in each packet accurate position for the audio packet wirelessly transmitted from the data source device to the data sink device.

15. The system of claim 12, wherein the control module includes position estimation information for all the audio packets in an aggregated audio packet wirelessly transmitted from the source device to the sink device.

16. The system of claim 15, wherein the control module adds vertical and horizontal position information to each audio packet and aggregates multiple audio packets together utilizing a packetization process, and transmits the aggregated audio packets from the data source device to the data sink device over the wireless communication medium.

17. The system of claim 11, wherein the wireless audio source comprises a High-Definition Multimedia Interface (HDMI) device.

18. The system of claim 17 further comprising:
the data sink device comprising a reconstruction module that reconstructs an HDMI frame by inserting received audio packets into horizontal and vertical blanking periods of the HDMI frame.

19. The system of claim 18, wherein the data sink device reconstructs an HDMI frame by generating HDMI signals at three Transition Minimized Differential Signaling (TMDS) channels according to the horizontal and vertical positions, with audio packet header and horizontal and vertical blanking at channel 0, and audio data at channels 1 and 2.

20. A wireless transmitter comprising:
a control module that transmits digital audio information including horizontal and vertical position information determined from audio packets within a High-Definition Multimedia Interface (HDMI) frame.

21. The wireless transmitter of claim 20, further comprising:
a parser module that obtains the horizontal and vertical position information of audio packets, wherein the wireless transmitter comprises an HDMI transmitter.

22. The wireless transmitter of claim 21, wherein the parser module obtains the horizontal and vertical position information of audio packets by determining horizontal and vertical position of a current data island including audio, within vertical and horizontal blanking areas in the HDMI frame.

23. The wireless transmitter of claim 22, wherein the control module includes in each packet accurate position for the audio packet wirelessly transmitted from the wireless transmitter.

24. The wireless transmitter of claim 22, wherein the control module includes position estimation information for all the audio packets in an aggregated audio packet wirelessly transmitted from the wireless transmitter.

25. The wireless transmitter of claim 24, wherein the control module adds vertical and horizontal position information to each audio packet and aggregating multiple audio packets together utilizing a packetization process, and transmits the aggregated audio packets from the wireless transmitter to a data sink device over the wireless communication medium.

26. The wireless transmitter of claim 25, wherein the control module estimates audio packet distribution pattern and including the estimated audio packet distribution in the aggregated packet, wherein the estimated audio packet distribution pattern comprises line distance of two neighboring audio packets within the HDMI frame.

27. A wireless receiver comprising:
a receiver module that receives digital audio information including horizontal and vertical position information determined from audio packets within a High-Definition Multimedia Interface (HDMI) frame.

28. The wireless receiver of claim 27, wherein the receiver module obtains the horizontal and vertical position information of audio packets based on horizontal and vertical position of a current data island including audio, within vertical and horizontal blanking areas in the HDMI frame.

29. The wireless receiver of claim 28, wherein each packet includes accurate position for the audio packet wirelessly received by the wireless receiver.

30. A method of communicating audio information, comprising:
including horizontal and vertical position information within a High-Definition Multimedia Interface (HDMI) frame; and
wirelessly receiving digital audio information including the position information from a data source device.

31. The method of claim 30, further comprising obtaining the horizontal and vertical position information of audio packets within the HDMI frame, wherein the obtaining includes:
determining horizontal and vertical position of a current data island including audio, within vertical and horizontal blanking areas in the frame.

32. The method of claim 31, wherein each audio packet carries accurate position for the audio packet wirelessly received from the data source.

33. The method of claim 32 wherein:
receiving audio information further includes receiving position estimation information for all the audio packets carried in an aggregated audio packet that is wirelessly received from the source device.

34. The method of claim 33, wherein the received audio information further includes:
vertical and horizontal position information added to each audio packet and multiple audio packets aggregated together utilizing a packetization process; and
the aggregated audio packets are received from the data source device over a wireless communication medium.

35. The method of claim 33 further comprising:
reconstructing a frame by inserting received audio packets into horizontal and vertical blanking periods of the frame.

36. The method of claim 35, wherein reconstructing a frame further comprises:
generating signals at three Transition Minimized Differential Signaling (TMDS) channels according to the horizontal and vertical positions, with audio packet header and horizontal and vertical blanking at channel 0, and audio data at channels 1 and 2.

37. The method of claim 30, further comprising:
obtaining position information of audio packets within the frame.

* * * * *